United States Patent
Nishikawa et al.

(10) Patent No.: US 9,187,069 B2
(45) Date of Patent: Nov. 17, 2015

(54) BRAKE CONTROL DEVICE FOR MOTORCYCLE

(75) Inventors: Yutaka Nishikawa, Saitama (JP);
Kazuya Takenouchi, Saitama (JP);
Takehiko Nanri, Saitama (JP);
Kazuhiko Tani, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 863 days.

(21) Appl. No.: 12/856,763

(22) Filed: Aug. 16, 2010

(65) Prior Publication Data
US 2011/0043031 A1 Feb. 24, 2011

(30) Foreign Application Priority Data

Aug. 19, 2009 (JP) ................................. 2009-190039

(51) Int. Cl.
*B60T 8/17* (2006.01)

(52) U.S. Cl.
CPC ................................. *B60T 8/1706* (2013.01)

(58) Field of Classification Search
CPC ........ B60T 8/1706; B60T 8/368; B60T 8/345
USPC ............... 303/9.64, 9.71, 137, 138, 155, 186
See application file for complete search history.

(56) References Cited

U.S. PATENT DOCUMENTS

| | | | | |
|---|---|---|---|---|
| 4,494,800 A | * | 1/1985 | Hayashi | 303/9.64 |
| 6,062,660 A | * | 5/2000 | Matsuno et al. | 303/173 |
| 6,409,285 B1 | * | 6/2002 | Wakabayashi et al. | 303/9.64 |
| 2006/0138857 A1 | * | 6/2006 | Nakayama et al. | 303/3 |
| 2007/0040446 A1 | * | 2/2007 | Hamm | 303/137 |
| 2007/0228818 A1 | * | 10/2007 | Tsuchida et al. | 303/115.1 |
| 2009/0118961 A1 | * | 5/2009 | Eckert et al. | 701/71 |
| 2009/0216416 A1 | * | 8/2009 | Nanri et al. | 701/70 |
| 2009/0242303 A1 | * | 10/2009 | Tahara et al. | 180/219 |

FOREIGN PATENT DOCUMENTS

| | | |
|---|---|---|
| JP | 11-5580 A | 1/1999 |
| JP | 2000-272572 A | 10/2000 |

* cited by examiner

*Primary Examiner* — Robert A Siconolfi
*Assistant Examiner* — Mahbubur Rashid
(74) *Attorney, Agent, or Firm* — Birch, Stewart, Kolasch & Birch, LLP (57) ABSTRACT

To prevent deterioration of sports driving performance due to the actuation of an ABS in a front-wheel and rear-wheel interlocking brake system of a brake-by-wire system. A brake interlock determining portion starts a front-wheel brake when input hydraulic pressure by a brake operation (pedal operation) on a rear-wheel becomes equal to or greater than an interlocking brake starting pressure value. A threshold selecting switch allows switching of the interlocking brake starting pressure value between when the ABS is active and when the ABS is inactive. When the ABS is active, a lower pressure value is selected as the interlocking brake starting pressure value. When the ABS is inactive, an upper pressure value is selected as the interlocking brake starting pressure value.

20 Claims, 5 Drawing Sheets

BRAKE CONTROL DEVICE FOR MOTORCYCLE

CROSS-REFERENCE TO RELATED APPLICATIONS

The present application claims priority under 35 USC 119 to Japanese Patent Application No. 2009-190039 filed on Aug. 19, 2009 the entire contents of which are hereby incorporated by reference.

FIELD OF THE INVENTION

The present invention relates to a brake control device for a motorcycle. More particularly, to a brake control device for a motorcycle which actuates front-wheel and rear-wheel brakes in an interlocking manner by a pedal operation.

DESCRIPTION OF BACKGROUND ART

A brake control device for a motorcycle is known wherein a front-rear interlocking brake system allows a front-wheel brake as well as a rear-wheel brake to be actuated in an interlocking manner by only operating a brake pedal. For example, JP-A No. H11-5580 discloses a braking device for a motorcycle in which front and rear wheels can be braked by operation of either a brake lever and a brake pedal. When the brake lever is operated, the distribution of a braking force to the front wheel is set to be larger than that to the rear wheel. When the brake pedal is mildly operated, the distribution of a braking force to the rear wheel is set to be larger than that to the front wheel.

In recent years, in the front-rear interlocking brake system an anti-lock brake system (ABS) control is available for preventing the front and rear wheels from being locked, by reducing brake hydraulic pressures to be supplied to a front-wheel brake and a rear-wheel brake. See, for example, JP-A No. 2000-272572.

In the driving of motorcycles placed in the category of so-called super sports bikes, the attitude of a vehicle body may be controlled by adjusting braking force applied to a rear wheel mainly with a brake pedal. Therefore, in the stroke range of the brake pedal for controlling the attitude, a front-wheel brake might be preferably not applied too hard. For this reason, since front-wheel brake caliper pressure is set to start to work after pedal input hydraulic pressure (oil pressure) has reached a predetermined high hydraulic pressure, the rear-wheel brake is actually actuated alone in the stroke range of the brake pedal for controlling the attitude, with control performance equal to normal rear-wheel braking.

However, in the case where the front-wheel and rear-wheel interlocking brake system with the ABS control is employed, there is a possibility that, once the rear wheel is locked and the ABS control becomes active, no larger braking force can be applied to the rear wheel even when the brake pedal is strongly operated. Therefore, in order to generate a further braking force by only operating the brake pedal, an application of a braking force to the front wheel which is not locked is necessary. Thus, the brake pedal might have to be pushed with a force to exceed the threshold set to a high hydraulic pressure so as to permit control of the vehicle body attitude.

SUMMARY AND OBJECTS OF THE INVENTION

Accordingly, an object of an embodiment of the present invention is to provide a brake control device for a motorcycle which allows a braking force to be applied to a front wheel without pushing a brake pedal more strongly than normal braking when ABS control is activated.

According to an embodiment of the present invention to achieve the above-mentioned object a brake control device for a motorcycle is provided with a front-wheel and rear-wheel interlocking brake system of a brake-by-wire system which allows a braking force to be applied to front wheels and rear wheels in an interlocking manner by a brake operation on the rear wheel, and an anti-lock brake system (ABS), wherein, when input hydraulic pressure of a rear-wheel brake operating unit becomes equal to or greater than a rear-wheel brake starting pressure value (first pressure value), hydraulic pressure to be led to a rear-wheel brake caliper is raised depending on the operational force of the rear-wheel brake operating unit. In addition, when the input hydraulic pressure of the rear-wheel brake operating unit becomes equal to or greater than an interlocking brake starting pressure value (third pressure value) that is greater than the rear-wheel brake starting pressure value, hydraulic pressure to be led to a front-wheel brake caliper is started to rise. Also, the brake control device includes means for presetting an upper pressure value and a lower pressure value that is lower than the upper pressure value, as the interlocking brake starting pressure value (third pressure value); and threshold selecting means for selecting the lower pressure value while the ABS is active, and selecting the upper pressure value while the ABS is inactive.

According to an embodiment of the present invention, after input hydraulic pressure of the rear-wheel brake operating unit has become equal to or greater than the interlocking brake starting pressure value (third pressure value), the hydraulic pressure led to the front wheel brake caliper is raised depending on the operational force of the rear-wheel brake operating unit.

According to an embodiment of the present invention, the rear-wheel brake operating unit is a brake pedal.

According to an embodiment of the present invention, rising of the brake caliper pressure is controlled by calculation as a preset function corresponding to the operational force of the rear-wheel brake operating unit, or by use of a preset map.

According to an embodiment of the present invention, when the ABS is active, a rising gradient of the front-wheel brake caliper hydraulic pressure is changed depending on ABS actuating hydraulic pressure.

According to an embodiment of the present invention, the change of the rising gradient of the front-wheel brake caliper pressure is performed during only a predetermined time, and thereafter, the pressure rising is controlled by calculation as a preset function corresponding to the operational force of the rear-wheel brake operating unit, or by use of a preset map.

According to an embodiment of the present invention, in the brake control device of the front-wheel and rear-wheel interlocking brake system, in the state in which the rear-wheel ABS is inactive, the front-wheel and rear-wheel interlocking brake is not started until the rear-wheel brake operating force falls within a greater force range. This allows the braking focusing on vehicle body attitude control in which the action of the front-wheel brake is much smaller than that of the rear-wheel brake. On the other hand, in the state in which the rear-wheel ABS is active, the front-wheel and rear-wheel interlocking brake is started when the rear-wheel brake operating force falls within a smaller force range. This allows the braking focusing on decelerating performance. In this manner, according to the front-wheel and rear-wheel interlocking brake device, braking performance is further improved in either case where the ABS is active or inactive.

Furthermore, it is possible to perform a change of the parts and the reduction in setting man-hours for optimization of the specifications for the vehicle body, such as to provide an improvement in grip force of a rear tire, front-rear load distribution for suppressing the occurrence of locking of the rear tire and the like. In addition, the cost increases can be limited.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
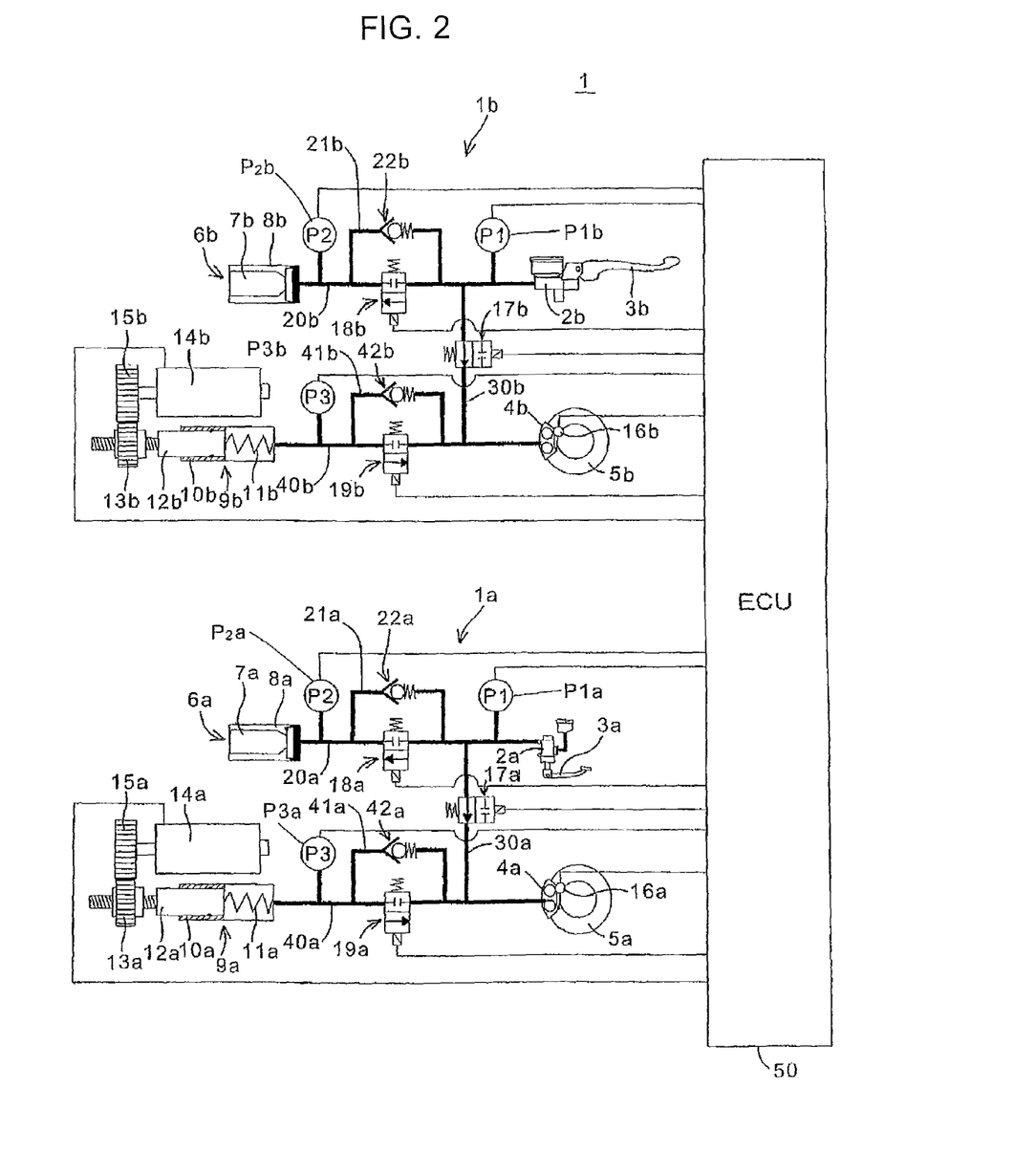
FIG. 2 is a hydraulic circuit diagram of the brake control device according to one embodiment of the present invention.

Hereinafter, one embodiment of the present invention will be described with reference to the accompanying drawings. FIG. 2 is a hydraulic circuit diagram of a brake control device for a motorcycle according to one embodiment of the present invention. The brake control device 1 is composed of a rear-wheel braking circuit 1a and a front-wheel braking circuit 1b which are independent of each other, and an ECU 50 serving as control means for controlling the braking circuits 1a and 1b.

In FIG. 2, elements of the brake control device 1 are referred to by the reference signs each consisting of a numeral and a lower-case alphabetic letter designate, in which the same numerals designate similar portions of the front-wheel and rear-wheel braking circuits, and the lower-case letters "a" designate the elements of the rear-wheel side and the lower-case letters "b" designate the elements of the front-wheel side. Except for a brake operating unit 3 composed of a brake pedal 3a and a brake lever 3b, the braking circuits 1a and 1b are configured in the same manner as each other. Therefore, hereinafter, with regard to the configuration of the braking circuits 1a and 1b, descriptions will be provided only for the rear-wheel braking circuit 1a.

A rear-wheel brake operation by an occupant is performed by pushing the brake operating unit (brake pedal) 3a attached to a footrest step (not shown), and a front-wheel brake operation is performed by gripping the brake operating unit (brake lever) 3b attached to a handlebar (not shown).

The braking circuit 1a includes a hydraulic (oil-hydraulic) circuit for actuating a brake caliper 4a with the pressure transmitted by an operating fluid (brake fluid). This braking circuit 1a is configured with a brake-by-wire (BBW) system. In the brake-by-wire system, an operation of the brake pedal 3a allows the hydraulic pressure generated in a master cylinder 2a to be detected by a pressure sensor (P1a or P2a to be described later), instead of to be directly supplied to the brake caliper 4a, and, based on the detected output value, a hydraulic pressure modulator 9a is driven to actuate the brake caliper 4a.

The brake control device 1 employs a front-wheel and rear-wheel interlocking device which automatically actuate the front-wheel braking circuit 1b as well as the rear-wheel braking circuit 1a by operating the brake pedal 3a. Also, the brake control device 1 includes an ABS function in which, regardless of an operation by the occupant, the application of a braking force is instantaneously and intermittently released to prevent wheel locking. Furthermore, the brake control device 1 can be provided with a fail-safe function whereby a route is switched so that the hydraulic pressure generated by the master cylinder 2a is directly supplied to the brake caliper 4a in order to enable a normal brake operation rather than the brake-by-wire system, when a failure has occurred in the hydraulic pressure modulator 9a or the like.

When the hydraulic pressure is supplied from the hydraulic pressure modulator 9a to the brake caliper 4a, the brake caliper 4a presses a brake pad (not shown) as a friction body against a brake disk 5a to generate a frictional force therebetween. This frictional force gives a brake force to the wheel rotating integrally with the brake disk 5a to decelerate the vehicle. The brake caliper 4a is provided with a vehicle speed sensor 16a for detecting the vehicle speed of the motorcycle from the rotary speed of the wheel.

The master cylinder 2a and the brake caliper 4a are connected by a main pipe 30a provided with a third electromagnetic valve 17a of a normally open type (NO type). Note that, in the descriptions below, the side on which the master cylinder 2a is provided will be referred to as the input side of the braking circuit, and the side on which the brake caliper 4a is provided will be referred to as the output side of the braking circuit.

The master cylinder 2a and the brake caliper 4a are connected by the main pipe 30a via the third electromagnetic valve 17a. The main pipe 30a is connected to a first branch pipe 20a on the input side of the braking circuit. A hydraulic loss simulator 6a is connected to the first branch pipe 20a via a first electromagnetic valve 18a of a normally closed type (NC type). When the third electromagnetic valve 17a is in the on-state to close the main pipe 30a, the hydraulic loss simulator 6a causes a pseudo hydraulic reaction force corresponding to a manipulated variable of the brake pedal 3a to act on the master cylinder 2a. The first electromagnetic valve 18a opens the first branch pipe 20a at the time of the brake operation by the occupant, and allows the master cylinder 2a and the hydraulic loss simulator 6a to communicate with each other.

The hydraulic loss simulator 6a is provided with a resin spring 7a as an elastic member at the rear of a hydraulic piston slidably housed in a cylinder 8a, and serves as a device for generating a hydraulic reaction force in the master cylinder 2a by a snapping force of the resin spring 7a when the hydraulic pressure generated by the master cylinder 2a is supplied through the first branch pipe 20a. Thus, an operational reaction force is generated in the brake pedal 3a, and an operational feeling corresponding to the brake operating force can be provided to the occupant. It should be noted that the elastic member provided on the hydraulic loss simulator 6a may be a metal spring or the like. Further, by combining plural elastic members with different snapping forces or the like, the relation of the stroke amount and the operation reaction force of the brake pedal 3a can be adjusted as appropriate.

The first branch pipe 20a is provided with a bypass passage 21a which bypasses the first electromagnetic valve 18a, and the bypass passage 21a is provided with a check valve 22a which allows the flow of operating fluid from the hydraulic loss simulator 6a side toward the master cylinder 2a.

A second branch pipe 40a is connected to the main pipe 30a on the output side of the braking circuit. The hydraulic pressure modulator 9a is connected to the second branch pipe 40a via a second electromagnetic valve 19a of a normally closed type (NC type). The hydraulic pressure modulator 9a generates the hydraulic pressure to be supplied to the brake caliper 4a, by pressing a hydraulic piston 12a inside a cylinder 10a with use of the driving force of a motor 14a as an actuator.

As the rotational drive of the motor 14a of the hydraulic pressure modulator 9a is performed in accordance with a drive command from the ECU 50, the rotational drive of a drive gear 15a and a driven gear 13a meshing therewith is performed. A feed screw mechanism which converts a rotational motion to a linear motion is provided between the driven gear 13a and the piston 12a. An optional hydraulic pressure is generated in the second branch pipe 40a by rotating the motor 14a in a predetermined direction with a current value determined based on a predetermined duty ratio.

A return spring 11a is provided inside the cylinder 10a for providing a snapping force directing the piston 12a back to the initial position. The piston 12a may be returned to the initial position by causing a reverse rotation of the motor 14a. The piston 12a may be, alternatively, configured to be returned to the initial position by the snapping force of the return spring 11a, even without driving the motor 14a.

The second branch pipe 40a is provided with a bypass passage 41a which bypasses the second electromagnetic valve 19a, and the bypass passage 41a is provided with a check valve 42a which allows the flow of operating fluid from the hydraulic pressure modulator 9a side toward the brake caliper 4a.

A first pressure sensor P1a and a second pressure sensor P2a are provided on the input side of the braking circuit. A third pressure sensor P3a is provided on the output side of the braking circuit. The first pressure sensor P1a and the second pressure sensor P2a on the input side detect the manipulated variable of the brake pedal 3a, while the third pressure sensor P3a on the output side detects the hydraulic pressure of the brake caliper 4a required for feedback control of the motor 14a.

The first pressure sensor P1a is provided on the main pipe 30a between the master cylinder 2a and the third electromagnetic valve 17a. The second pressure sensor P2a is provided on the first branch pipe 20a between the hydraulic loss simulator 6a and the first electromagnetic valve 18a. The third pressure sensor P3a is provided on the second branch pipe 40a between the hydraulic pressure modulator 9a and the second electromagnetic valve 19a. For the second pressure sensor P2a, there is used a pressure sensor which has higher resolution and detection accuracy than the first pressure sensor P1a and the third pressure sensor P3.

Respective output signals from the first to third pressure sensors P1a to P3a are inputted to the ECU 50. Based on the output signals of the first pressure sensor P1a, the second pressure sensor P2a, the third pressure sensor P3a, and the vehicle speed sensor 16a, the ECU 50 can perform opening/closing controls of the first electromagnetic valve 18a, the second electromagnetic valve 19a, and the third electromagnetic valve 17a, as well as can perform proper drive controls of the front and rear brakes of the motorcycle by performing the rotational drive of the motor 14a.

In this embodiment, the two pressure sensors P1a and P2a are provided on the input side for detecting the brake operating force, thereby allowing the brake control using the hydraulic pressure modulator 9a to be continued even when a failure occurs in one of the pressure sensors. Also, the provision of the two pressure sensors P1a and P2a on the input side allows the output values of the two sensors to be compared so that a failure diagnosis of the two sensors can be executed, even when the third electromagnetic valve 17a is closed to disconnect the input side and the output side from each other.

Hereinafter, an example of the operation of the braking circuit while the vehicle is stationary or in motion will be described. In the descriptions below, the portions in which the front and rear wheels are individually controlled will first be described with reference to the rear-wheel brake, and then the front-wheel and rear-wheel interlocking brake operation will be described.

When the vehicle is stationary, the third electromagnetic valve 17a is in the opened state, the first electromagnetic valve 18a is in the closed state, and the second electromagnetic valve 19a is in the closed state. When the vehicle starts to move, the rotary speeds of the front and rear wheels detected by the vehicle speed sensor 16a is inputted to the ECU 50. Subsequently, the vehicle speed is calculated based on the higher rotary speed between the front and rear wheels. When it is detected that the vehicle speed has become equal to or more than a travel determination value (5 km/h, for example), the third electromagnetic valve 17a is energized to be switched to the closed state and the first electromagnetic valve 18a is switched to the opened state to be in a stand-by state. Thus, the master cylinder 2a and the hydraulic loss simulator 6a are allowed to communicate with each other. In the stand-by state, the second electromagnetic valve 19a is in the closed state (non-energized state), and the stand-by state is held until the brake operation is performed by the occupant.

When the vehicle is stationary or the vehicle speed is below the travel determination value (hereinafter referred to as "during a vehicle stop"), the first to third electromagnetic valves 18a, 19a, and 17a are in non-energized states. During a vehicle stop, therefore, the hydraulic pressure generated in the master cylinder 2a according to the manipulated variable of the brake pedal 3a is applied to the brake caliper 4a through the main pipe 30 to generate braking force. In other words, during a vehicle stop, braking force is directly applied instead of using the brake-by-wire system.

When the occupant pushes the brake pedal 3a in the stand-by state to generate the hydraulic pressure of equal to or greater than a predetermined value in the master cylinder 2a, the ECU 50 detects, based on the output signal of the first pressure sensor P1a or the second pressure sensor P2a, that the brake operation has been started, and energizes the second electromagnetic valve 19a to allow the hydraulic pressure modulator 9a and the brake caliper 4a to communicate with each other. At the same time, the ECU 50 drives the motor 14*a* to supply a predetermined hydraulic pressure to the brake caliper 4*a*.

The third electromagnetic valve 17*a* is closed while the hydraulic pressure is being supplied to the brake caliper 4*a* by the hydraulic pressure modulator 9*a*. Thus, the fluctuation of the hydraulic pressure due to the actuation of the hydraulic pressure modulator 9*a* is not transmitted to the brake pedal 3*a*. Therefore, a brake operational feeling artificially reproduced in the hydraulic loss simulator 6*a* is generated in the brake pedal 3*a*. At the time of the brake operation, the fluctuation of the hydraulic pressure of the hydraulic pressure modulator 9*a* is not transmitted to the brake pedal 3*a*. Therefore, the operation reaction force accompanying the activation of the ABS is not generated.

In this manner, in the braking device for a vehicle according to this embodiment, the third electromagnetic valve 17*a* is closed and the first electromagnetic valve 18*a* is opened to be in the stand-by state when the vehicle reaches the predetermined vehicle speed. Therefore, the input side of the braking circuit can be separated in advance from the output side of the braking circuit during vehicle travelling. Accordingly, the operation stroke at the time of the brake operation can be stabilized.

The hydraulic pressure generated in the master cylinder 2*a* is not transmitted to the second pressure sensor P2*a* unless being switched to the stand-by state to bring the first electromagnetic valve 18*a* to the opened state. More specifically, even when a large operating force is applied to the brake pedal 3*a* during a vehicle stop to generate an excessive hydraulic pressure in the master cylinder 2*a*, this hydraulic pressure is not transmitted to the second pressure sensor P2*a*. Thus, in the stand-by state, the second pressure sensor P2*a* with a high resolution, which is used for improving the detection accuracy of the brake operating force, can be protected from the excessive hydraulic pressure.

Next, the operation of the front-wheel and rear-wheel interlocking brake will be described. The front-wheel and rear-wheel interlocking braking device is commonly called a combined brake system (CBS) in which front and rear braking circuits are actuated in an interlocking manner by a brake operation on one side of the front and rear wheels. The front-wheel and rear-wheel interlocking braking device according to this embodiment is, in particular, a pedal brake CBS in which an operation of the brake pedal 3*a* for the rear wheel automatically causes braking force to act on the front wheel as well as the rear wheel. More specifically, when the brake pedal 3*a* is pushed in the stand-by state, the hydraulic pressure (pedal input pressure) detected by the first pressure sensor P1*a* or the second pressure sensor P2*a* rises depending on the manipulated variable of the brake pedal 3*a*. Subsequently, when the pedal input pressure becomes equal to or greater than a rear-wheel brake starting pressure value (first pressure value), a braking force starts to be applied to the rear wheel. Further, when the pedal input pressure becomes equal to or greater than an interlocking brake starting pressure value (third pressure value) set to be greater than the first pressure value, the braking force also starts to be applied to the front wheel. The braking forces to the front and rear wheels, that is, the hydraulic pressures to be applied to the brake calipers 4*a* and 4*b* are increased in accordance with the rising characteristic of the pedal input pressure.

In addition, in this embodiment, the above-described third pressure value is set to be different between when the ABS is active and when the ABS is inactive. That is to say, the third pressure value includes an upper pressure value and a lower pressure value, and when the ABS is active, the lower pressure value which is lower than the pressure value when the ABS is inactive, is used.

Figure 1:
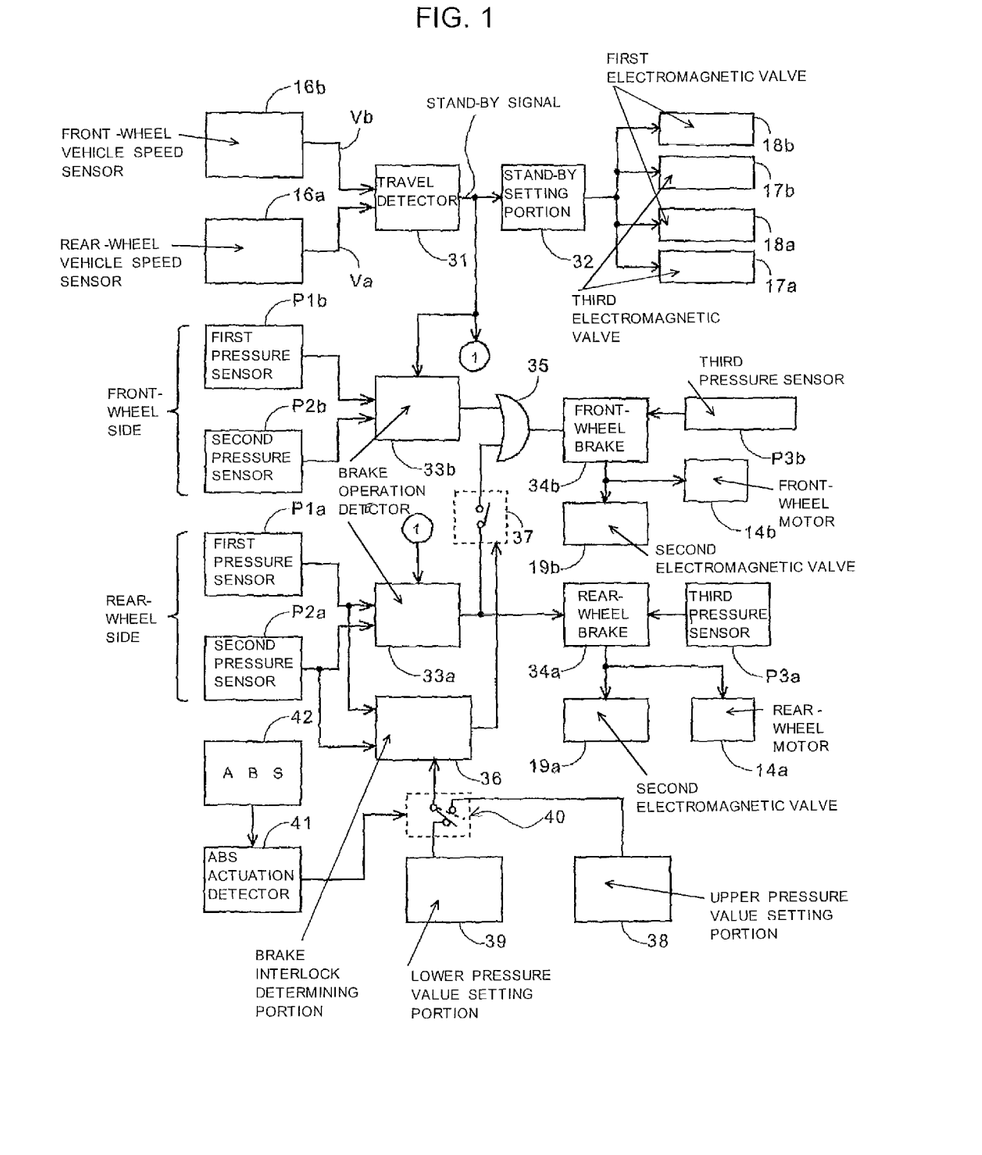
FIG. 1 is a block diagram showing the functions of the essential parts of a brake control device according to one embodiment of the present invention.

The function of the brake control device 1 corresponding to the above-described operation will be described. FIG. 1 is a block diagram showing the functions of the essential parts of the ECU 50. Referring to FIG. 1, signals detected by the rear-wheel and front-wheel vehicle speed sensors 16*a* and 16*b* are inputted to a travel detector 31 of the ECU 50. The travel detector 31 detects whether the vehicle is traveling or stationary, depending on whether or not the larger signal between the detection signals (vehicle speeds Va and Vb) of the vehicle speed sensors 16*a* and 16*b* is equal to or greater than a predetermined travel determination value V1 (5 km/h, for example). When the travel detector 31 detects that the vehicle is traveling, the travel detector 31 outputs a stand-by signal as a stand-by state. When the travel detector 31 detects that the vehicle is stationary or moving at a vehicle speed below the V1, the travel detector 31 stops the output of the stand-by signal as a non-BBW state.

A stand-by setting portion 32 actuates, when the stand-by signal is inputted from the travel detector 31, the first electromagnetic valves 18*a* and 18*b* on the rear and front wheels and the third electromagnetic valves 17*a* and 17*b* on the rear and front wheels to set a stand-by state. When no stand-by signal is inputted, the stand-by setting portion 32 releases the stand-by state, and causes the first electromagnetic valves 18*a* and 18*b* on the rear and front wheels and the third electromagnetic valves 17*a* and 17*b* on the rear and front wheels to be inactive to return to an initial state, that is to say, to the non-BBW state.

The stand-by signal is inputted to rear-wheel and front-wheel brake operation detectors 33*a* and 33*b* as a brake operation detection starting trigger. The rear-wheel brake operation detector 33*a* takes in, when the stand-by signal is inputted thereto, the signal (rear-wheel brake operating value) detected by the first pressure sensor P1*a* or the second pressure sensor P2*a*. The front-wheel brake operation detector 33*b* takes in, when the stand-by signal is inputted thereto, the signal (front-wheel brake operating value) detected by the first pressure sensor P1*b* or the second pressure sensor P2*b*.

The brake operation detector 33*a* detects whether or not a rear-wheel brake operation has been started, depending on whether or not the detected signal is equal to or greater than the rear-wheel brake starting pressure value (first pressure value). On the other hand, the brake operation detector 33*b* detects whether or not a front-wheel brake operation has been started, depending on whether or not the detected signal is equal to or greater than a front-wheel brake starting pressure value (second pressure value).

When it is detected that the front-wheel brake operation has been started, a brake command is inputted to a front-wheel brake 34*b*, along with the detection signal, which shows the operating force of the brake lever 3*b*, of the first pressure sensor P1*b* or the second pressure sensor P2*b* in the braking circuit 1*b*. Further, as will be described later, the detection signals from the rear-wheel brake operation detector 33*a* are selectively inputted to the input side of the front-wheel brake 34*b*, and an OR function 35 is additionally provided for permitting the actuation based on any of those signals.

The front-wheel brake 34*b* drives the second electromagnetic valve 19*b* in the braking circuit 1*b* to allow the hydraulic pressure modulator 9*b* on the front wheel to communicate with the brake caliper 4*b* on the front wheel, thereby applying a braking force to the front wheel. In other words, the hydraulic pressure (detected by the pressure sensor P3*b*) corresponding to the brake operating force indicated by means of the signal detected by the first pressure sensor P1*b* or the second pressure sensor P2b, is applied to the brake caliper 4b on the front wheel. The hydraulic pressure applied to the brake caliper 4b on the front wheel is controlled based on the drive duty of the motor 14b on the front wheel.

In the same manner, when it is detected that the rear-wheel brake operation has been started, a brake command is inputted to a rear-wheel brake 34a, along with the detection signal, which shows the operating force of the brake pedal 3a, of the first pressure sensor P1a or the second pressure sensor P2a in the braking circuit 1a. The rear-wheel brake 34a drives the second electromagnetic valve 19a in the braking circuit 1a to allow the hydraulic pressure modulator 9a on the rear wheel to communicate with the brake caliper 4a on the rear wheel, thereby applying a braking force to the rear wheel. In other words, the hydraulic pressure (detected by the pressure sensor P3a) corresponding to the brake operating force indicated by means of the signal detected by the first pressure sensor P1a or the second pressure sensor P2a, is applied to the brake caliper 4a on the rear wheel. The hydraulic pressure applied to the brake caliper 4a on the rear wheel is controlled based on the drive duty of the motor 14a on the rear wheel.

When the brake pedal 3a is operated, a brake interlock determining portion 36 determines whether or not the larger signal between the detection signals (brake operating force) of the first pressure sensor P1a and the second pressure sensor P2a on the rear wheel is equal to or greater than the interlocking brake starting pressure value (third pressure value) which allows the front and rear wheels to start the braking operation in an interlocking manner. When the brake operating force is equal to or greater than the third pressure value, an interlock signal is supplied to an interlock switch 37. The interlock switch 37 is normally opened, and turned to the "closed position", that is, to the ON position in response to the interlock signal. As a result, the brake command, along with the detection signal of the first pressure sensor P1a or the second pressure sensor P2a in the braking circuit 1b, is inputted from the brake operation detector 33a on the rear wheel to the front-wheel brake 34b through the OR function 35. Therefore, even in the case where the brake lever 3b is not operated, when the brake operating force by the brake pedal 3a generates a hydraulic pressure of equal to or greater than the third pressure value, the braking force is also applied to the front wheel. On the other hand, in the case where the brake lever 3b is operated during operation of the interlocking brake, for example, when the brake operating force by the brake lever 3b generates a hydraulic pressure of equal to or greater than the second pressure value, priority is preferably given to the operation of the brake lever 3b, while, when the brake operating force by the brake lever 3b generates a hydraulic pressure of only below the second pressure value, a braking force is preferably applied to the front wheel according to the brake operating force by the brake pedal 3a.

In this embodiment, the third pressure value to start the front-rear interlocking brake operation may be preset in plural stages. For example, an upper pressure value and a lower pressure value are set for an upper pressure value setting portion 38 and a lower pressure value setting portion 39, respectively. Subsequently, one of the pressure values is selected as a third pressure value depending on switching of a threshold selecting switch 40 to be inputted to the brake interlock determining portion 36. The brake interlock determining portion 36 determines whether or not to start the interlocking brake operation, depending on whether or not the detection signal of the first pressure sensor P1a or the second pressure sensor P2a is equal to or greater than the selected third pressure value.

The threshold selecting switch 40 is switched depending on whether the ABS is active or inactive. An ABS actuation detector 41 detects the active or inactive condition of an ABS 42. When the ABS 42 is inactive, the ABS actuation detector 41 switches the threshold selecting switch 40 to the side of the upper pressure value setting portion 38 to select the upper pressure value. On the other hand, when the ABS 42 is active, the ABS actuation detector 41 switches the threshold selecting switch 40 to the side of the lower pressure value setting portion 39 to select the lower pressure value set to be lower than the upper pressure value.

Here, the ABS 42 may have a well-known configuration. For example, a locking state of the rear wheel is detected based on the difference between the respective vehicle speed values detected by the vehicle speed sensors 16a and 16b on the rear and front wheels, and when it is detected that the rear wheel is locked, the hydraulic pressure applied to the brake caliper 4a of the rear wheel is decreased and increased. The decrease and increase of the hydraulic pressure is performed by, for example, opening and closing the second electromagnetic valve 19a on the rear wheel in a predetermined cycle.

Figure 3:
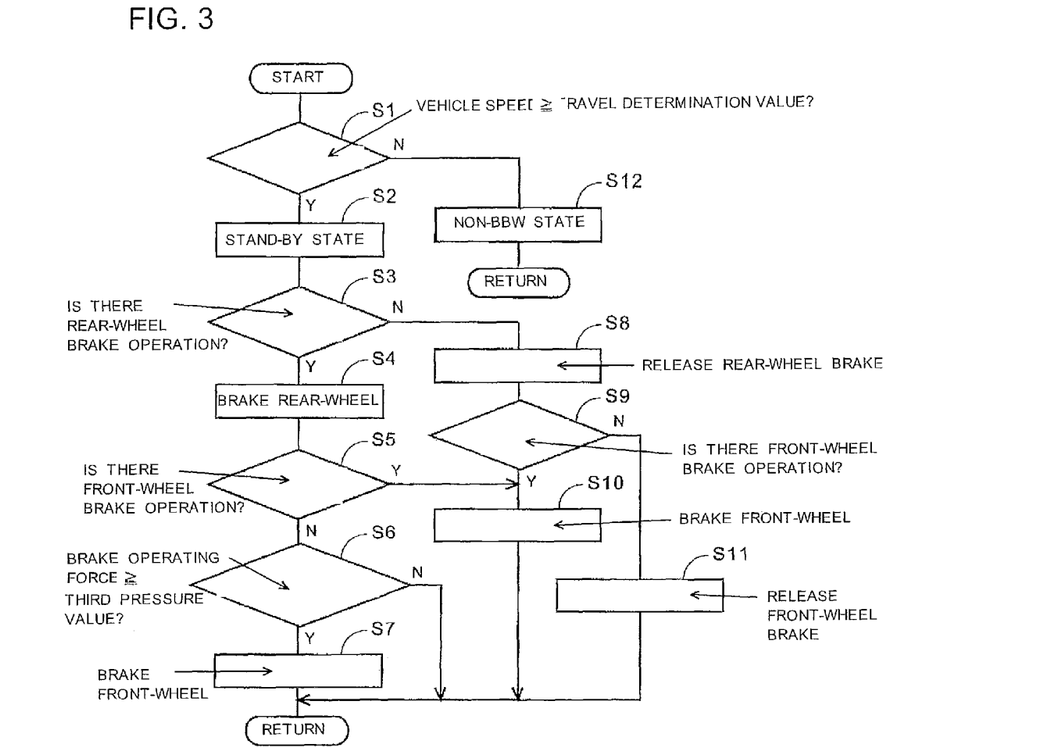
FIG. 3 is a flowchart showing the process of the essential parts of the brake control device according to one embodiment of the present invention.

FIG. 3 is a flowchart showing the operation of the brake control device. Referring to FIG. 3, in step S1, it is determined whether or not the higher speed (hereinafter referred to as "vehicle speed V") between the vehicle speeds Va and Vb detected by the vehicle speed sensors 16a and 16b, respectively, is equal to or more than the travel determination value V1. When the vehicle speed V is equal to or more than the travel determination value V1, the process proceeds to step S2 to set the stand-by state. In step S3, it is determined whether or not the brake pedal 3a is operated by the force to generate the hydraulic pressure of equal to or greater than the brake operating force (first pressure value). When the brake pedal 3a generates the hydraulic pressure of equal to or greater than the first pressure value on the first branch pipe 20a, a positive determination is made in step 3, and therefore the process proceeds to step 4. In step 4, the rear wheel is braked. That is to say, the motor 14a is driven to generate the hydraulic pressure on the second branch pipe 40a, thereby actuating the brake caliper 4a. The brake is released when the stand-by state is canceled or when the operational force of the brake pedal 3a is reduced to below the first pressure value.

In step S5, it is determined whether or not the brake lever 3b is operated by the brake operating force to generate the hydraulic pressure of equal to or greater than the front-wheel brake starting pressure value (second pressure value) on the first branch pipe 20b. When the brake lever 3b generates the hydraulic pressure of equal to or greater than the second pressure value on the first branch pipe 20b, positive determination is made in step S5, and therefore the process proceeds to step S10. In step S10, the front wheel is braked. That is to say, the motor 14b is driven to generate the hydraulic pressure on the second branch pipe 40b, thereby actuating the brake caliper 4b. The front-wheel brake is released when the stand-by state is canceled or when the operational force of the brake lever 3b is reduced to below the second pressure value.

When the brake lever 3b is not operated by the brake operating force to generate the hydraulic pressure of equal to or greater than the front-wheel brake starting pressure value (second pressure value) on the first branch pipe 20b, the process proceeds to step S6 to determine whether or not the hydraulic pressure of equal to or greater than the third pressure value is applied on the first branch pipe 20a by the operational force of the brake pedal 3a. When the hydraulic pressure of equal to or greater than the third pressure value is applied on the first branch pipe 20a, the process proceeds from step S6 to step S7 to brake the front wheel.

When it is determined that the rear-wheel brake is not operated, that is, negative determination is made in step S3. More specifically, when the hydraulic pressure generated by the brake pedal 3a is below the first pressure value, the process proceeds to step S8 to release the rear-wheel brake. The release of the rear-wheel brake is performed by causing a reverse rotation of the motor 14a to reduce the hydraulic pressure on the second branch pipe 40a.

In step S9, the presence or absence of the front-wheel brake is determined, depending on whether or not the brake lever 3b is operated by the brake operating force to generate the hydraulic pressure of equal to or greater than the front-wheel brake starting pressure value (second pressure value). When the brake lever 3b generates the hydraulic pressure of equal to or greater than the second pressure value on the first branch pipe 20b, positive determination is made in step S9, and the process proceeds to step S10 to brake the front wheel. When negative determination is made in step S9, the process proceeds to step S11 to release the front-wheel brake. The release of the front-wheel brake is performed by causing a reverse rotation of the motor 14b to reduce the hydraulic pressure on the second branch pipe 40b.

When negative determination is made in step S1, that is, when it is determined that the vehicle is stationary, the process proceeds to step S12 to perform switching to the non-BBW state.

Figure 4:
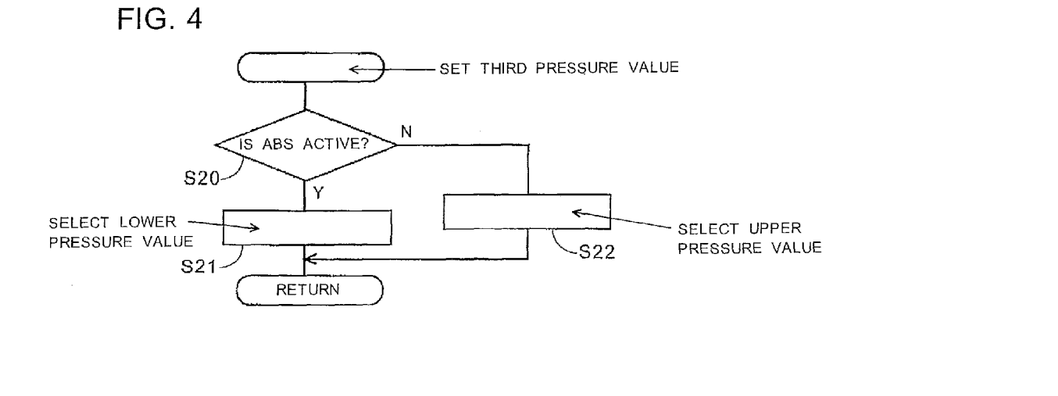
FIG. 4 is a flowchart showing the process for setting of a third pressure value for interlocking brake.

FIG. 4 is a flowchart for setting of the third pressure value described above. In step S20, it is determined whether or not the ABS is active. When positive determination is made in step S20, the process proceeds to step S21, in which the lower pressure value is set, as the third pressure value, into the brake interlock determining portion 36. When negative determination is made in step S20, that is, when the ABS is inactive, the process proceeds to step S22, in which the upper pressure value is set into the brake interlock determining portion 36.

Figure 5:
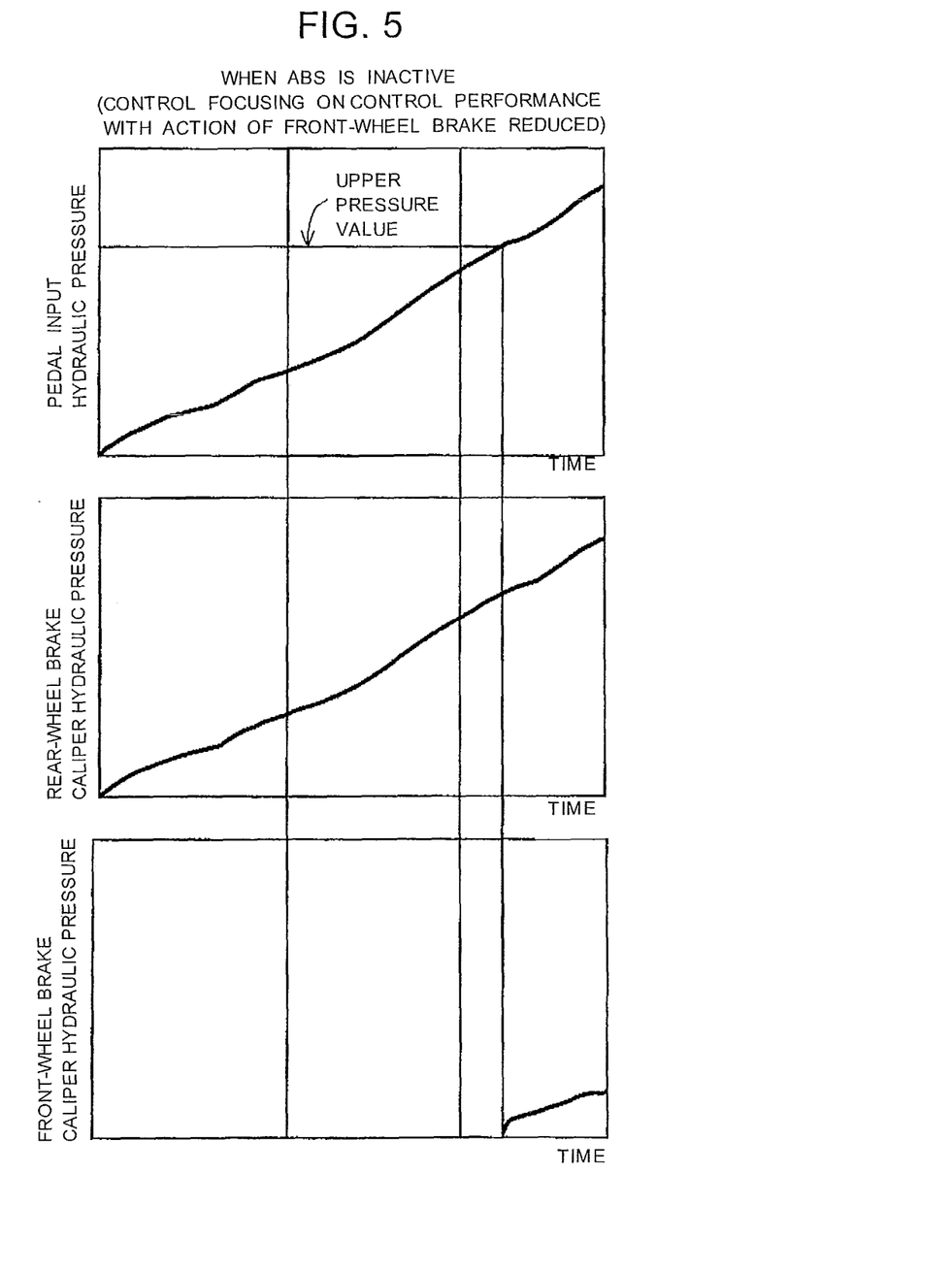
FIG. 5 is graphs showing the relation between brake pedal hydraulic pressure, rear-wheel brake caliper hydraulic pressure, and front-wheel brake caliper hydraulic pressure when the ABS is inactive.
Figure 6:
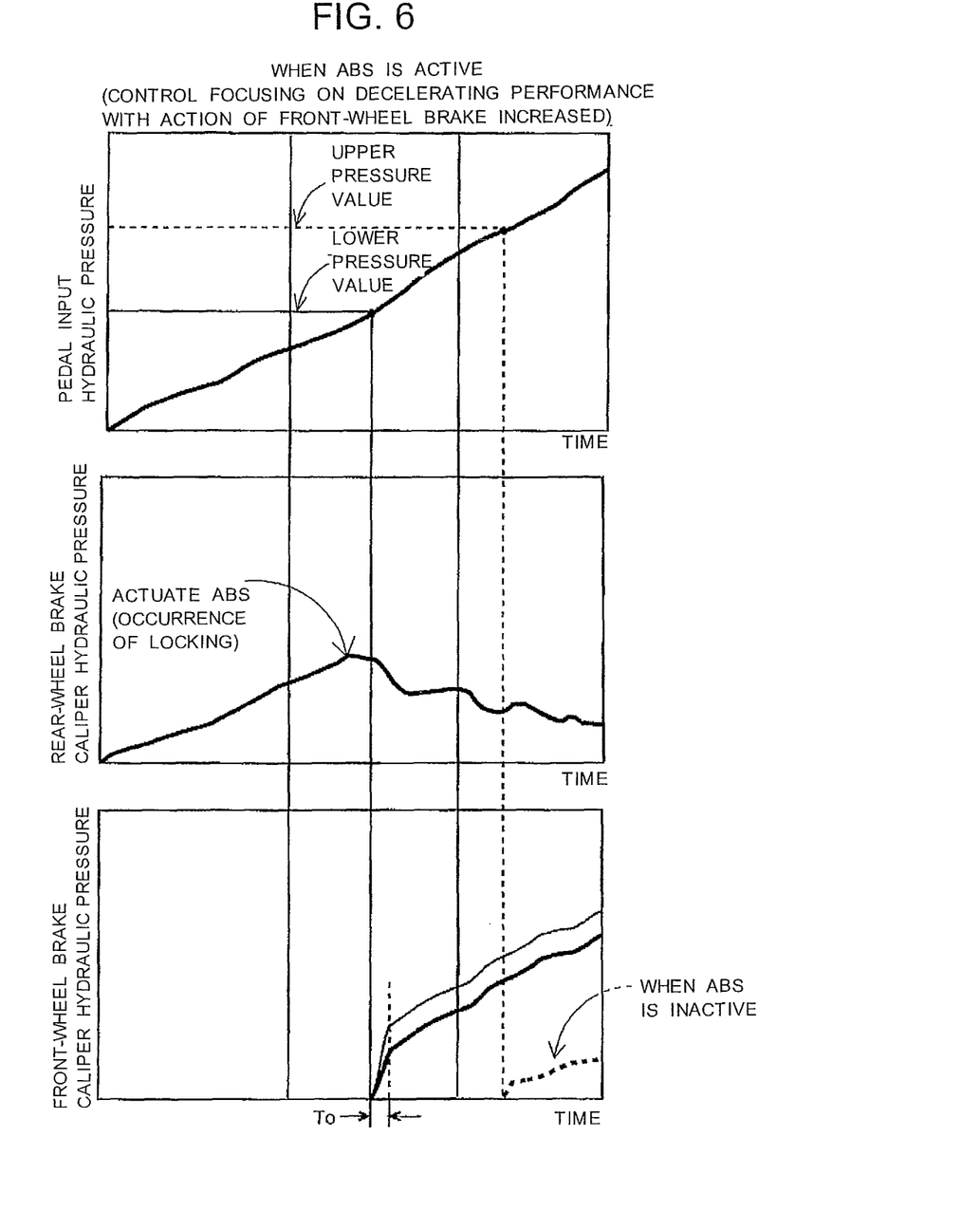
FIG. 6 is graphs showing the relation between brake pedal hydraulic pressure, rear-wheel brake caliper hydraulic pressure, and front-wheel brake caliper hydraulic pressure when the ABS is active.

FIG. 5 is graphs showing the front-wheel and rear-wheel brake caliper hydraulic pressures while the ABS is inactive, and FIG. 6 is graphs showing the front-wheel and rear-wheel brake caliper hydraulic pressures including while the ABS is active. FIGS. 5 and 6 are the graphs in which the front-wheel and rear-wheel brakes are actuated in an interlocking manner by only the rear-wheel brake operation without the front-wheel brake operation. In each graph, the horizontal axis represents time and the vertical axis represents hydraulic pressure.

In each of FIGS. 5 and 6, the upper graph shows a change with time in the input hydraulic pressure (the larger detection hydraulic pressure between the first pressure sensor P1a and the second pressure sensor P2a) by the brake pedal 3a. The middle graph shows the hydraulic pressure (the detection hydraulic pressure of the third pressure sensor P3a) applied to the brake caliper 4a on the rear wheel. Further, the lower graph shows the hydraulic pressure (the detection hydraulic pressure of the third pressure sensor P3b) applied to the brake caliper 4b on the front wheel. For comparison, in FIG. 6, the lower graph additionally shows a change in the front-wheel brake hydraulic pressure while the ABS is inactive.

While the ABS is inactive, as shown in FIG. 5, the hydraulic pressure applied to the brake caliper 4a on the rear wheel increases with increase in operational force (pedal input hydraulic pressure) of the brake pedal 3a. Also, when the operational force by the brake pedal 3a reaches the third pressure value (upper pressure value), the hydraulic pressure applied to the brake caliper 4b on the front wheel starts to be generated.

As described above, while the ABS is inactive, the action of the front-wheel brake is made extremely smaller than that of the rear-wheel brake to cause the brake pedal 3a to act alone so as to expand the range of sports driving (that is, performing control of the vehicle body attitude by rear-wheel braking).

On the other hand, at the time of the operation including while the ABS is active, the operational force of the brake pedal 3a increases. However, once locking of the rear wheel occurs to activate the ABS, the hydraulic pressure applied to the brake caliper 4a on the rear wheel is reduced, as shown in FIG. 6. Also, while the ABS is active, the third pressure value is switched to the lower pressure value. Therefore, when the operational force by the brake pedal 3a reaches the lower pressure value, the hydraulic pressure to be applied to the brake caliper 4b on the front wheel starts to be generated. At this time, the hydraulic pressure is steeply raised during the initial phase (during time T0) of rising of the hydraulic pressure. After a lapse of time T0, the degree of pressure rising is reduced. In this manner, when the ABS is active, the action of the front wheel is increased so as to perform switching from the control suitable for sports driving to the control focusing on decelerating performance.

Here, the degree of rising of the hydraulic pressure to be applied to the brake caliper 4b on the front wheel is determined by a calculation using a functional expression preset as a function of the pedal input hydraulic pressure, that is, the operational force of the rear-wheel brake operating unit 3a, or according to a map preset by a function of the operational force.

Also, the degree of the gradient during the initial phase (during time T0) of rising of the hydraulic pressure may be changed depending on the amount of hydraulic pressure (hereinafter referred to as "ABS actuating hydraulic pressure") applied to the rear-wheel brake caliper 4a while the ABS is active. That is to say, when the ABS actuating hydraulic pressure is greater than a predetermined value, the gradient of the pressure rising during time T0 is increased, relative to the case where the ABS actuating hydraulic pressure is lower than the predetermined value, so as to perform quick pressure rising. Also, after a lapse of time T0, pressure rising is performed according to a function (or map) of the operational force of the rear-wheel brake operating unit 3a. As described above, by changing the rising gradient of the hydraulic pressure to be applied to the front-wheel brake caliper 4b depending on the ABS actuating hydraulic pressure, it is possible to set the most suitable brake hydraulic pressure for smooth braking. The lower graph in FIG. 6 illustrates higher and lower hydraulic pressure rising gradients of the front-wheel brake caliper 4b.

Although the present invention has been described above according to one embodiment, the scope of the invention is not limited to this embodiment. Various changes may be made thereto by those skilled in the art without departing from the scope of claims. For example, the decrease or increase of the hydraulic pressure while the ABS is active may be performed in accordance with a well-known ABS. Furthermore, the rear-wheel brake operating unit is not limited to the pedal, and also can include a brake lever provided on a left grip of the steering handlebar, in the same manner as the front-wheel brake operating unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake control device for a motorcycle provided with a front-wheel and rear-wheel interlocking brake system of a brake-by-wire system for allowing a braking force to be applied to front and rear wheels in an interlocking manner by a brake operation on the rear wheel, the brake control device comprising:
- an anti-lock brake system (ABS);
- a rear-wheel brake operating unit 3a adapted to operate a rear-wheel brake caliper 4a;
- a front brake operating unit 3b adapted to operate a front-wheel brake caliper 4b; and
- a motor,
- wherein the anti-lock brake system (ABS) includes:
  - a first pressure sensor P1a and a second pressure sensor P2a provided on an input side of a rear-wheel braking circuit, the first pressure sensor P1a and the second pressure sensor P2a being adapted to detect a manipulated variable of the rear-wheel brake operating unit 3a;
  - a third pressure sensor P3a provided on the an output side of the rear-wheel braking circuit and is connected to a branch pipe extending between an electromagnetic valve and a hydraulic pressure modulator,
  - the third pressure sensor P3a being adapted to detect a hydraulic pressure of the rear-wheel brake caliper 4a required for feedback control of the motor of the rear-wheel braking circuit, and
- at a time of operation of the rear-wheel brake operating unit 3a while the anti-lock brake system (ABS) is active,
- an operational force of the rear-wheel brake operating unit 3a increases, and once locking of the rear wheel occurs to activate the anti-lock brake system (ABS), the hydraulic pressure applied to the rear-wheel brake caliper 4a on the rear wheel is reduced, and the third pressure value P3a is switched to a lower pressure value, and
- when the operational force by the rear-wheel brake operating unit 3a reaches the lower pressure value, a hydraulic pressure to be applied to the front-wheel brake caliper 4b is generated and is steeply raised during an initial phase, predetermined time period (T0) of rising of the hydraulic pressure applied to the front-wheel brake caliper 4b, and
- after a lapse of the predetermined time period (T0), a degree of rising of the hydraulic pressure applied to the front-wheel brake caliper 4b is reduced, so that an action of the front-wheel brake caliper 4b is increased so as to perform switching control of the brake control device from a degree suitable for sports driving to control of the brake control device to a degree suitable for decelerating performance of the motorcycle.

2. The brake control device for a motorcycle according to claim 1, further comprising:
- a brake interlock determining portion;
- wherein when the brake interlock determining portion determines that an input hydraulic pressure of the rear-wheel brake operating unit becomes equal to or greater than a rear-wheel brake starting pressure value (first pressure value), the hydraulic pressure to be led to a rear-wheel brake caliper is raised depending on the operational force of the rear-wheel brake operating unit,
- wherein when the brake interlock determining portion determines that the input hydraulic pressure of the rear-wheel brake operating unit becomes equal to or greater than an interlocking brake starting pressure value (third pressure value) that is greater than the rear-wheel brake starting pressure value (the first pressure value), a hydraulic pressure to be led to a front-wheel brake caliper is started to rise,
- the brake control device further comprising:
  - upper and lower pressure value setting portions adapted to set an upper pressure value and a lower pressure value that is lower than the upper pressure value, as the interlocking brake starting pressure value (the third pressure value); and
  - a threshold selecting switch adapted to communicate with the lower pressure value setting portion in order to select the lower pressure value while the anti-lock brake system (ABS) is active, and adapted to communicate with the upper pressure value setting portion in order to select the upper pressure value while the anti-lock brake system (ABS) is inactive,
- wherein after the input hydraulic pressure of the rear-wheel brake operating unit has become equal to or greater than the interlocking brake starting pressure value (the third pressure value), the hydraulic pressure led to the front-wheel brake caliper is raised depending on the operational force of the rear-wheel brake operating unit.

3. The brake control device for a motorcycle according to claim 1, wherein the third pressure sensor P3a is an only pressure sensor provided on the output side of the rear-wheel braking circuit, and
the rear-wheel brake operating unit is a brake pedal.

4. The brake control device for a motorcycle according to claim 1, wherein the degree of rising of the hydraulic pressure applied to the front-wheel brake caliper 4b is determined by calculation using a function expression preset as a function of the hydraulic pressure input by the rear-wheel brake operating unit 3a or according to a preset map that has been preset by a function of the operational force.

5. The brake control device for a motorcycle according to claim 1, wherein increasing of a brake caliper pressure is controlled by the anti-lock brake system (ABS) as a preset expression function corresponding to the operational force of the rear-wheel brake operating unit, or by use of a preset map.

6. The brake control device for a motorcycle according to claim 1, wherein, when the anti-lock brake system (ABS) is active, a rising gradient of the hydraulic pressure of the front-wheel brake caliper is changed depending on an actuating pressure of the anti-lock brake system (ABS).

7. The brake control device for a motorcycle according to claim 6, wherein the change of the rising gradient of the hydraulic pressure of the front-wheel brake caliper is performed only during the predetermined time period (T0), and thereafter, the pressure rising is controlled by the anti-lock brake system (ABS) as a preset expression function corresponding to the operational force of the rear-wheel brake operating unit, or by use of a preset map.

8. A brake control device for a motorcycle comprising:
- a front-wheel and rear-wheel interlocking brake system of a brake-by-wire system for allowing a braking force to be applied to front and rear wheels in an interlocking manner by a brake operation on the rear wheel;
- the brake control device comprising:
- an anti-lock brake system (ABS);
- a rear-wheel brake operating unit 3a adapted to operate a rear-wheel brake caliper 4a;
- a front brake operating unit 3b adapted to operate a front-wheel brake caliper 4b; and
- a motor,
- wherein the anti-lock brake system (ABS) includes:
  - at least one pressure sensor for detecting a brake operating force of the rear-wheel brake operating unit 3a on the rear wheel, the at least one pressure sensor being provided on an input side of the rear-wheel braking circuit, and being adapted to detect a manipulated variable of the rear-wheel brake operating unit 3a; and a third pressure sensor P3a provided on the an output side of the rear-wheel braking circuit and is connected to a branch pipe extending between an electromagnetic valve and a hydraulic pressure modulator, the third pressure sensor P3a being adapted to detect a hydraulic pressure of the rear-wheel brake caliper 4a required for feedback control of the motor of the rear-wheel braking circuit, and at a time of operation of the rear-wheel brake operating unit 3a while the anti-lock brake system (ABS) is active, an operational force of the rear-wheel brake operating unit 3a increases, and once locking of the rear wheel occurs to activate the anti-lock brake system (ABS), the hydraulic pressure applied to the rear-wheel brake caliper 4a on the rear wheel is reduced, and the third pressure value P3a is switched to a lower pressure value, and when the operational force by the rear-wheel brake operating unit 3a reaches the lower pressure value, a hydraulic pressure to be applied to the front-wheel brake caliper 4b is generated and is steeply raised during an initial phase, predetermined time period (T0) of rising of the hydraulic pressure applied to the front-wheel brake caliper 4b, and after a lapse of the predetermined time period (T0), a degree of rising of the hydraulic pressure applied to the front-wheel brake caliper 4b is reduced, so that an action of the front-wheel brake caliper 4b is increased so as to perform switching control of the brake control device from a degree suitable for sports driving to control of the brake control device to a degree suitable for decelerating performance of the motorcycle.

9. The brake control device for a motorcycle according to claim 8, further comprising:
a brake interlock determining portion;
wherein when the brake interlock determining portion determines that an input hydraulic pressure of the rear-wheel brake operating unit becomes equal to or greater than a rear-wheel brake starting pressure value (first pressure value), the hydraulic pressure to be led to a rear-wheel brake caliper is raised depending on the operational force of the rear-wheel brake operating unit,
wherein when the brake interlock determining portion determines that the input hydraulic pressure of the rear-wheel brake operating unit becomes equal to or greater than an interlocking brake starting pressure value (third pressure value) that is greater than the rear-wheel brake starting pressure value (the first pressure value), a hydraulic pressure to be led to a front-wheel brake caliper is started to rise,
the brake control device further comprising:
upper and lower pressure value setting portions adapted to set an upper pressure value and a lower pressure value that is lower than the upper pressure value, as the interlocking brake starting pressure value (the third pressure value); and
a threshold selecting switch adapted to communicate with the lower pressure value setting portion in order to select the lower pressure value while the anti-lock brake system (ABS) is active, and adapted to communicate with the upper pressure value setting portion in order to select the upper pressure value while the anti-lock brake system (ABS) is inactive, wherein after the input hydraulic pressure of the rear-wheel brake operating unit has become equal to or greater than the interlocking brake starting pressure value (the third pressure value), the hydraulic pressure led to the front-wheel brake caliper is raised depending on the operational force of the rear-wheel brake operating unit.

10. The brake control device for a motorcycle according to claim 8, wherein the third pressure sensor P3a is an only pressure sensor provided on the output side of the rear-wheel braking circuit, and
the rear-wheel brake operating unit is a brake pedal.

11. The brake control device for a motorcycle according to claim 8, wherein the degree of rising of the hydraulic pressure applied to the front-wheel brake caliper 4b is determined by calculation using a function expression preset as a function of the hydraulic pressure input by the rear-wheel brake operating unit 3a or according to a preset map that has been preset by a function of the operational force.

12. The brake control device for a motorcycle according to claim 8, wherein increasing of a brake caliper pressure is controlled by the anti-lock brake system (ABS) as a preset expression function corresponding to the operational force of the rear-wheel brake operating unit, or by use of a preset map.

13. The brake control device for a motorcycle according to claim 8, wherein, when the anti-lock brake system (ABS) is active, a rising gradient of the hydraulic pressure of the front-wheel brake caliper is changed depending on an actuating pressure of the anti-lock brake system (ABS).

14. The brake control device for a motorcycle according to claim 13, wherein the change of the rising gradient of the hydraulic pressure of the front-wheel brake caliper is performed only during the predetermined time period (T0), and thereafter, the pressure rising is controlled by the anti-lock brake system (ABS) as a preset expression function corresponding to the operational force of the rear-wheel brake operating unit, or by use of a preset map.

15. A brake control device for a motorcycle comprising:
a front-wheel and rear-wheel interlocking brake system of a brake-by-wire system for allowing a braking force to be applied to front and rear wheels in an interlocking manner by a brake operation on the rear wheel;
an anti-lock brake system (ABS);
a rear-wheel brake operating unit 3a adapted to operate a rear-wheel brake caliper 4a;
a front brake operating unit 3b adapted to operate a front-wheel brake caliper 4b; and
an electric motor,
wherein the anti-lock brake system (ABS) includes:
two pressure sensors P1a, P2a provided on an input side of a rear-wheel braking circuit, the two pressure sensors P1a, P2a being adapted to detect a manipulated variable of the rear-wheel brake operating unit 3a,
a third pressure sensor P3a provided on the an output side of the rear-wheel braking circuit and is connected to a branch pipe extending between an electromagnetic valve and a hydraulic pressure modulator,
the third pressure sensor P3a being adapted to detect a hydraulic pressure of the rear-wheel brake caliper 4a required for feedback control of the electric motor of the rear-wheel braking circuit, and
at a time of operation of the rear-wheel brake operating unit 3a while the anti-lock brake system (ABS) is active,
an operational force of the rear-wheel brake operating unit 3a increases, and once locking of the rear wheel occurs to activate the anti-lock brake system (ABS), the hydraulic pressure applied to the rear-wheel brake caliper 4a on the rear wheel is reduced, and the third pressure value P3a is switched to a lower pressure value, and when the operational force by the rear-wheel brake operating unit 3a reaches the lower pressure value, a hydraulic pressure to be applied to the front-wheel brake caliper 4b is generated and is steeply raised during an initial phase, predetermined time period (T0) of rising of the hydraulic pressure applied to the front-wheel brake caliper 4b, and after a lapse of the predetermined time period (T0), a degree of rising of the hydraulic pressure applied to the front-wheel brake caliper 4b is reduced, so that an action of the front-wheel brake caliper 4b is increased so as to perform switching control of the brake control device from a degree suitable for sports driving to control of the brake control device to a degree suitable for decelerating performance of the motorcycle.

16. The brake control device for a motorcycle according to claim 15, further comprising:

a brake interlock determining portion, wherein when the brake interlock determining portion determines that an input hydraulic pressure of the rear-wheel brake operating unit becomes equal to or greater than a rear-wheel brake starting pressure value (first pressure value), the hydraulic pressure to be led to a rear-wheel brake caliper is raised depending on the operational force of the rear-wheel brake operating unit, and wherein when the brake interlock determining portion determines that the input hydraulic pressure of the rear-wheel brake operating unit becomes equal to or greater than an interlocking brake starting pressure value (third pressure value) that is greater than the rear-wheel brake starting pressure value (the first pressure value), a hydraulic pressure to be led to a front-wheel brake caliper is started to rise, the brake control device further comprising:

upper and lower pressure value setting portions adapted to set an upper pressure value and a lower pressure value that is lower than the upper pressure value, as the interlocking brake starting pressure value (the third pressure value); and a threshold selecting switch adapted to communicate with the lower pressure value setting portion in order to select the lower pressure value while the anti-lock brake system (ABS) is active, and adapted to communicate with the upper pressure value setting portion in order to select the upper pressure value while the anti-lock brake system (ABS) is inactive, wherein after the input hydraulic pressure of the rear-wheel brake operating unit has become equal to or greater than the interlocking brake starting pressure value (the third pressure value), the hydraulic pressure led to the front-wheel brake caliper is raised depending on the operational force of the rear-wheel brake operating unit.

17. The brake control device for a motorcycle according to claim 15, wherein the third pressure sensor P3a is an only pressure sensor provided on the output side of the rear-wheel braking circuit, and the rear-wheel brake operating unit is a brake pedal.

18. The brake control device for a motorcycle according to claim 15, wherein the degree of rising of the hydraulic pressure applied to the front-wheel brake caliper 4b is determined by calculation using a function expression preset as a function of the hydraulic pressure input by the rear-wheel brake operating unit 3a or according to a preset map that has been preset by a function of the operational force.

19. The brake control device for a motorcycle according to claim 15, wherein increasing of a brake caliper pressure is controlled by the anti-lock brake system (ABS) as a preset expression function corresponding to the operational force of the rear-wheel brake operating unit, or by use of a preset map.

20. The brake control device for a motorcycle according to claim 15, wherein, when the anti-lock brake system (ABS) is active, a rising gradient of the hydraulic pressure of the front-wheel brake caliper is changed depending on an actuating hydraulic pressure of the anti-lock brake system (ABS).

* * * * *